US006476553B1

(12) United States Patent
Iida et al.

(10) Patent No.: US 6,476,553 B1
(45) Date of Patent: Nov. 5, 2002

(54) FLOURESCENT DISCHARGE TUBE WITH AMALGAM POSITIONING REQUIREMENTS AND BULB-SHAPED FLUORESCENT LAMP USING THE SAME

(75) Inventors: Shiro Iida, Takatsuki (JP); Takeshi Matsumura, Kashiwara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 191 days.

(21) Appl. No.: 09/614,262

(22) Filed: Jul. 12, 2000

(30) Foreign Application Priority Data

Jul. 14, 1999 (JP) .......................................... 11-200117

(51) Int. Cl.⁷ ........................... H01J 17/26; H01J 61/28
(52) U.S. Cl. ...................... 313/550; 313/547; 313/546; 313/564; 313/565; 313/566
(58) Field of Search ................................. 313/546, 547, 313/550, 551, 564, 565, 566

(56) References Cited

U.S. PATENT DOCUMENTS

| 4,972,118 A | * | 11/1990 | Yorifuji et al. | ............... 313/565 |
| 5,204,584 A | | 4/1993 | Ikeda et al. | ................... 313/565 |
| 5,719,465 A | * | 2/1998 | Den Breeijen et al. | ...... 313/490 |
| 5,739,633 A | | 4/1998 | Biro et al. | ..................... 313/490 |
| 5,814,936 A | * | 9/1998 | Martinet | ........................ 313/545 |
| 6,225,742 B1 | * | 5/2001 | Iida et al. | ........................ 315/56 |

FOREIGN PATENT DOCUMENTS

| EP | 0 758 795 A1 | | 2/1997 | | |
| JP | 61-277147 | | 12/1986 | | |
| JP | 61-277148 | | 12/1986 | | |
| JP | 62-211850 | | 9/1987 | | |
| JP | 1-220360 | | 9/1989 | | |
| JP | 9-106782 | | 4/1997 | | |
| JP | 9-147795 | | 6/1997 | | |
| JP | 02001068060 A | * | 3/2001 | ............ | H01J/61/30 |
| JP | 02001297731 A | * | 10/2001 | ............ | H01J/61/12 |
| WO | WO 96/19823 | | 6/1996 | | |

OTHER PUBLICATIONS

Patent Abstracts of Japan, English translation of abstract, entitled "Low Pressure Mercury Vapor Discharge Lamp", Publication No. 61277147, Date of Publication Dec. 8, 1986, one page.
Patent Abstract of Japan, English translation of abstract, entitled "Bulb Type Fluorescent Lamp", Publication No. 62211850, Date of Publication Sep. 17, 1987, one page.
Patent Abstracts of Japan, English translation of abstract, entitled "Low Pressure Mercury Vapor Discharge Lamp", Publication No. 61277148, Date of Publication Dec. 8, 1986, one page.
European Search Report, Application No. 00 11 5134.9–2208, dated Oct. 23, 2000, four pages.
Patent Abstracts of Japan, English translation of abstract entitled "Bulb Type Fluorescent Lamp", Publication No. 62211850, date of Publication Sep. 17, 1987, one page.
Patent Abstracts of Japan, English translation of abstract, Publication No. 09147795 A, Date of Publication Jun. 6, 1997, entitled "Compact Self–Ballasted Fluorescent Lamp", one page.
Patent Abstracts of Japan, English translation of abstract, entitled "Bent Type Fluorescent Lamp", Publication No. 01220360A, Date of Publication Sep. 4, 1989, one page.

* cited by examiner

*Primary Examiner*—Michael H. Day
*Assistant Examiner*—Glenn Zimmerman
(74) *Attorney, Agent, or Firm*—Rosenthal & Osha L.L.P.

(57) ABSTRACT

A small fluorescent discharge tube and a bulb-shaped fluorescent lamp using the same with improved rise characteristics with respect to luminous flux in the case of a relatively short non-operation time of one to six hours after a stop of operation are provided. The fluorescent discharge tube includes at least three U-shaped glass tubes joined to form one body, electrodes provided at the ends thereof, and one discharge path formed therein. The fluorescent discharge tube further includes first auxiliary amalgams in vicinities of the electrodes, main amalgams placed at least in two locations in the discharge path between the electrodes, and a second auxiliary amalgam placed at least in one location between the main amalgams.

17 Claims, 13 Drawing Sheets

US 6,476,553 B1

FLOURESCENT DISCHARGE TUBE WITH AMALGAM POSITIONING REQUIREMENTS AND BULB-SHAPED FLUORESCENT LAMP USING THE SAME

FIELD OF THE INVENTION

The present invention relates to a fluorescent discharge tube and a bulb-shaped fluorescent lamp using the same.

BACKGROUND OF THE INVENTION

Conventionally, three types of fluorescent lamps, for example, bulb-shaped fluorescent lamps, with luminous fluxes corresponding to 40 W, 60 W, and 100 W general electric lights have been developed and commercially expanded. Among these three types, the development of the fluorescent lamps with luminous fluxes corresponding to 60 W and 100 W general electric lights, which have high sales distribution ratios, has been continued. Recently, particularly in order to replace small general electric lights, the size of lamps is reduced increasingly in lamp design. Bulb-shaped fluorescent lamps having discharge tubes with various configurations have been proposed and commercialized.

As shown in FIGS. 11 and 12, a discharge tube formed of three U-shaped glass tubes joined with bridge junctions has been used in conventional bulb-shaped fluorescent lamps. In such a discharge tube, high lamp efficiency is achieved by increasing the length of a discharge path, and the size reduction of the lamp as an object also is achieved (JP 1-220360 A and JP 9-147795 A). Similarly, as shown in FIG. 13, a discharge tube formed of four U-shaped glass tubes joined together to increase the length of a discharge path also has been known (JP 9-106782 A).

However, in a bulb-shaped fluorescent lamp using a discharge tube formed of at least three U-shaped glass tubes having a long discharge path and many bends, an inherent problem arises because the lamp requires a longer rise time with respect to luminous flux at a start of its operation than that in, for example, a conventional discharge tube formed of two U-shaped glass tubes joined together.

Therefore, in order to improve such characteristics in rise time with respect to luminous flux (hereinafter referred to as "luminous-flux rise characteristics"), a layout method in which one main amalgam 55 and four auxiliary amalgams 52, 53, 56, and 57 are combined, as shown in FIG. 11, is disclosed. That is, one main amalgam 55 is placed inside a small tube 54 at an end of a U-shaped glass tube positioned at an end of a discharge tube 46. On the other hand, the two auxiliary amalgams 52 and 53 are placed in locations adjacent to electrodes 50 and 51, respectively, and the other additional auxiliary amalgams 56 and 57 are placed at both end portions of the U-shaped glass tube 48 and in a discharge path.

As shown in FIG. 12, in a discharge tube 58 formed of three U-shaped glass tubes 59, 60, and 61, a layout method in which two main amalgams 66 and 67 and three auxiliary amalgams 68, 69, and 70 are combined is employed. That is, the two respective main amalgams 66 and 67 are placed inside small tubes 64 and 65 at one end of the U-shaped glass tubes 59 and 61, respectively, positioned at the ends of the discharge tube 58. On the other hand, the two auxiliary amalgams 68 and 69 are placed in locations adjacent to electrodes 62 and 63, respectively, and another additional auxiliary amalgam 70 is positioned at an end portion of the U-shaped glass tube 60 and in a discharge path.

Furthermore, as shown in FIG. 13, in a discharge tube 75 formed of four U-shaped glass tubes 71, 72, 73, and 74, a layout method in which one main amalgam 81 and three auxiliary amalgams 78, 80, and 79 are combined is employed. That is, the two auxiliary amalgams 78 and 79 are provided in the vicinities of the electrodes 76 and 77 at the ends of the discharge tube 75. The other auxiliary amalgam 80 is provided at an end portion of the U-shaped glass tube 72 so as to be positioned substantially midway in a discharge path. The main amalgam 81 is placed at a location adjacent to the auxiliary amalgam 80 at an end of the U-shaped glass tube 73.

Such conventional techniques can achieve the size reduction in bulb-shaped fluorescent lamps using discharge tubes formed of at least three U-shaped glass tubes joined together, but still cannot obtain sufficient luminous-flux rise characteristics. In other words, while general electric lights have a luminous flux value corresponding to 100% of the luminous flux during a stable operation directly after a start of operation, the bulb-shaped fluorescent lamps according to the above-mentioned conventional techniques merely has a luminous flux value corresponding to 20% or lower of the luminous flux during a stable operation, even after three seconds from a start of operation. In this case, according to the study of the present inventors, it was found that the luminous-flux rise characteristics of the lamps depended on the non-operation time after a stop of operation, and particularly, in the case of a relatively short non-operation time of one to six hours after a stop of operation, the lamps required a longer rise time with respect to luminous flux, which was the biggest problem.

Such slow luminous-flux rise characteristics were not a big problem when the lamps were operated continuously for many hours for business use in shops, department stores, and the like in a conventional main application field. However, this problem should be solved when the lamps are to be used for residential lighting which will be turned on and off frequently. It can be said that this problem is a hindrance to the wide use of bulb-shaped fluorescent lamps as lamps for residential lighting.

SUMMARY OF THE INVENTION

The present invention is intended to obtain a small fluorescent discharge tube having further improved luminous-flux rise characteristics, even when a non-operation time after a stop of operation is relatively short, and a bulb-shaped fluorescent lamp using the same.

In order to achieve the aforementioned object, a fluorescent discharge tube of the present invention includes at least three U-shaped glass tubes joined to form one body, electrodes provided at the ends thereof, and one discharge path formed therein. In the vicinities of the electrodes, first auxiliary amalgams are provided, and main amalgams are positioned at least in two locations in the discharge path between the electrodes. At least in one location, a second auxiliary amalgam is positioned between the main amalgams.

A bulb-shaped fluorescent lamp of the present invention includes a fluorescent discharge tube and a lighting circuit. The fluorescent discharge tube includes at least three U-shaped glass tubes joined to form one body, electrodes provided at the ends thereof, and one discharge path formed therein. In the vicinities of the electrodes, first auxiliary amalgams are provided, and main amalgams are positioned at least in two locations in the discharge path between the electrodes. At least in one location, a second auxiliary amalgam is positioned between the main amalgams.

DETAILED DESCRIPTION OF THE INVENTION

Figure 1:
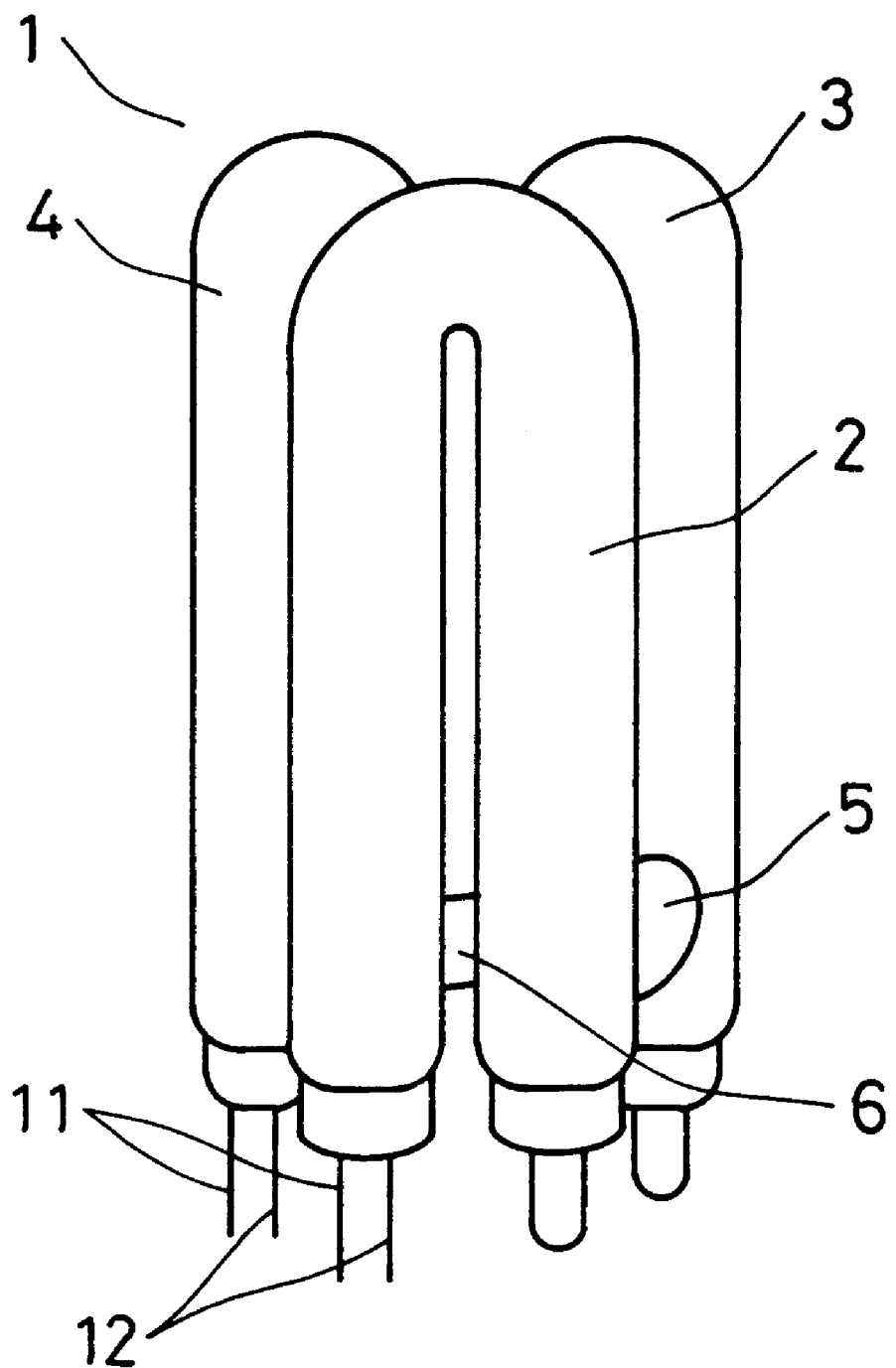
FIG. 1 is a perspective view of a fluorescent discharge tube according to a first embodiment of the present invention.

In the present invention, it is preferable that the main amalgams are positioned at inner ends (i.e. ends opposite to the ends also serving as the ends of the discharge tube) of the U-shaped glass tubes positioned at the both ends of the discharge tube. This allows an approximately equal amount of mercury diffusing from the main amalgams toward the first auxiliary amalgams to be trapped by the respective first auxiliary amalgams. Thus, the luminous-flux rise characteristics after a start of lamp operation can be improved further, even in the case of a relatively short non-operation time of one to six hours after a stop of operation.

In the present invention, it is preferable that the main amalgams are placed inside small tubes projecting at the ends of the glass tubes. When the main amalgams are placed inside the small tubes, they are positioned at a distance from the discharge path and can be maintained to have a low temperature during operation. Therefore, the mercury composition in the main amalgams can be increased and thus the main amalgams with a high Hg vapor pressure can be used. As a result, the luminous-flux rise characteristics after a start of lamp operation can be improved further.

In the present invention, it is preferable that the second auxiliary amalgam is placed inside a U-shaped glass tube other than the U-shaped glass tubes positioned at the ends of the discharge tube. When the respective U-shaped glass tubes are provided with auxiliary amalgams, Hg can be supplied inside all the U-shaped glass tubes during a non-operation time, thus improving the luminous-flux rise characteristics at a start of operation.

In the present invention, it is preferable that three or four U-shaped glass tubes are joined together. During a non-operation time, Hg moves from the main amalgams to the auxiliary amalgams. When three or four U-shaped glass tubes are used, the distance for which Hg moves is short and it does not take a long time to supply Hg. When five or more U-shaped glass tubes are used, the time required for supplying Hg tends to be longer.

In the present invention, it is preferable that the at least three U-shaped glass tubes are joined by bridge junction to form one body. Any methods of joining them may be acceptable, but the bridge junction is the easiest and general method. In this case, the bridge junction denotes that holes are formed in outer tube walls of respective U-shaped glass tubes and in portions positioned slightly inside from their ends and are joined together.

In the present invention, the first auxiliary amalgams are positioned in the vicinities of the electrodes positioned at the ends of the discharge tube. In this case, the term "vicinities" denotes distances of about 1 to 7 mm. When being positioned at a shorter distance than 1 mm from the electrodes, the first auxiliary amalgams come into contact with the electrodes. On the other hand, when the first auxiliary amalgams are positioned at a longer distance than 7 mm from the electrodes, it comes to be difficult that the first auxiliary amalgams receive heat from the electrodes effectively. The first auxiliary amalgams may be positioned on a side of the discharge path or the opposite side.

Furthermore, in the present invention, it is preferable that when the lamp is operated after a non-operation time of one to six hours after a stop of operation, there is a point of inflection in relative luminous flux before an elapse of five seconds after a start of operation. This can further improve the luminous-flux rise characteristics after a start of lamp operation even in the case of a relatively short non-operation time of one to six hours after a stop of the lamp operation.

In the bulb-shaped fluorescent lamp of the present invention, it is preferable that the bulb-shaped fluorescent lamp includes a glass globe covering the fluorescent discharge tube, a case accommodating the lighting circuit, and a base, and they are fixed.

Similarly, in the bulb-shaped fluorescent lamp of the present invention, the luminous-flux rise characteristics after a start of lamp operation can be improved further even in the case of a relatively short non-operation time of one to six hours after a stop of the lamp operation.

First Embodiment

Figure 2:
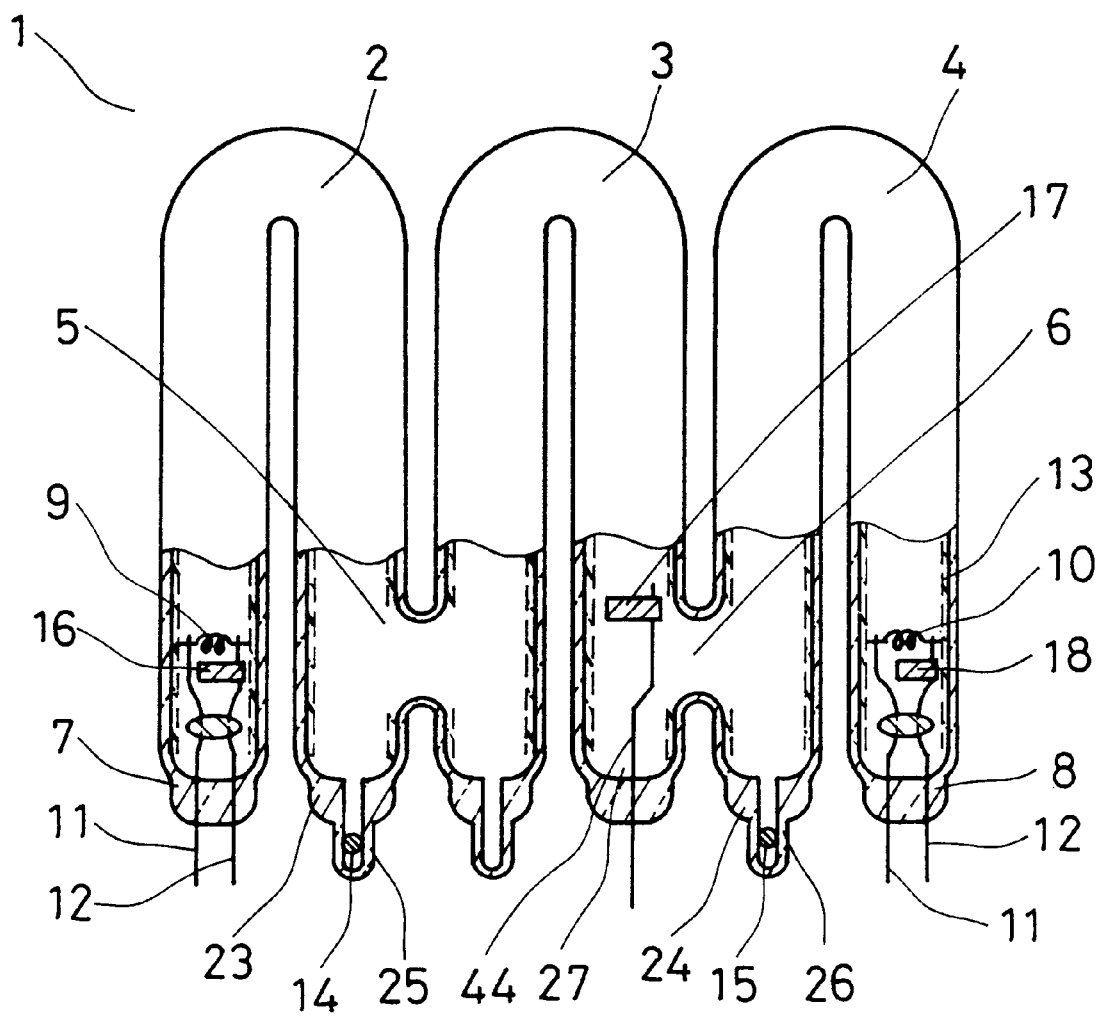
FIG. 2 is a development of the fluorescent discharge tube shown in FIG. 1.
Figure 3:
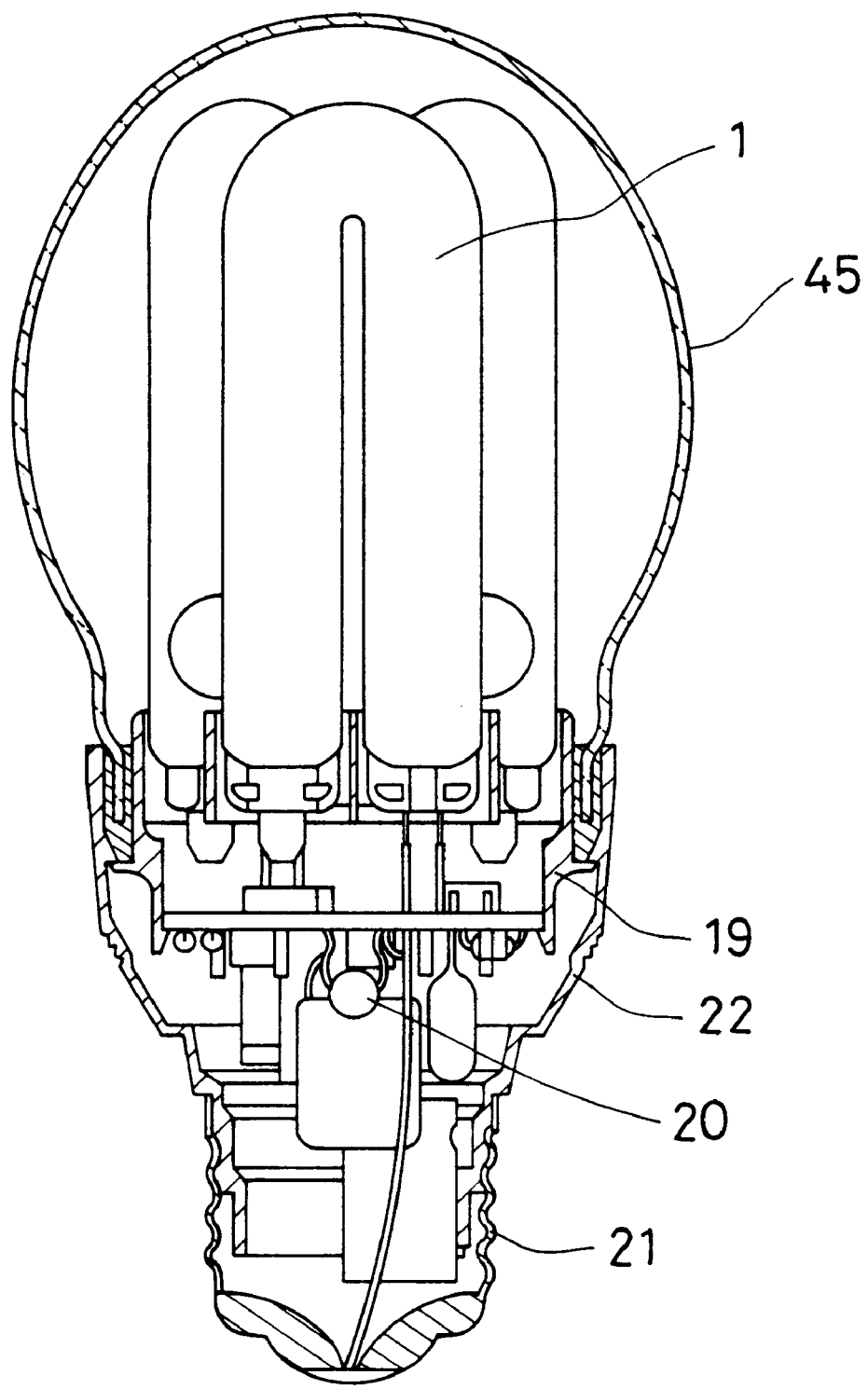
FIG. 3 is a partially cutaway front view of a bulb-shaped fluorescent lamp according to the first embodiment of the present invention.

A fluorescent discharge tube 1 according to a first embodiment of the present invention includes three U-shaped glass tubes, i.e. U-shaped glass tubes 2, 3, and 4, joined by a bridge junction to form one body as shown in FIGS. 1, 2, and 3. In the discharge tube 1, the U-shaped glass tubes 2, 3, and 4 are joined with so-called bridge junctions 5 and 6 to form one discharge path inside the discharge tube 1.

At the ends of the discharge path, i.e. at ends 7 and 8 of the U-shaped glass tubes 2 and 4 positioned at both ends of the discharge tube 1, tungsten coil electrodes 9 and 10 are placed while being supported by lead wires 11 and lead wires 12, respectively. The lead wires 12 are provided with first auxiliary amalgams 16 and 18 at a distance of 1 to 7 mm from the electrodes 9 and 10.

At the other ends (indicated with numerals 23 and 24 in FIG. 2) of the U-shaped glass tubes 2 and 4, small tubes 25 and 26 are provided. Inside the small tubes 25 and 26, main amalgams 14 and 15 are sealed.

The U-shaped glass tube other than the U-shaped glass tubes 2 and 4 positioned at the ends of the discharge tube 1, i.e. the U-shaped glass tube 3 in the middle has an end 27 at which a supporting wire 44 provided with another auxiliary amalgam 17 is sealed. Thus, the second auxiliary amalgam 17 is provided in the discharge path in the discharge tube 1.

Phosphors 13 are applied to the inner surfaces of the U-shaped glass tubes 2, 3, and 4. For the phosphors 13, a material obtained by mixing three kinds of rare earth phosphors emitting red, green, and blue lights, respectively, was used. The contents of the respective phosphors are shown as follows.

|  |  | Bulb-Light Color | Neutral White Color | Quasi-Daylight Color |
|---|---|---|---|---|
| (1) Blue | $Ba_{2.7}Mg_{4.74}Al_{33}$: $Eu_{0.29}$: $Mn_{0.06}$ | 0.5% | 23.2% | 34.5% |
| (2) Green | $LaPO_4$: Ce, Tb | 31.5% | 32.4% | 29.3% |
| (3) Red | $Y_2O_3$: Eu | 68.0% | 44.4% | 36.2% |

Based on the results (a) and (b) of the study described later, inside the discharge tube 1, the two main amalgams 14 and 15 and the three auxiliary amalgams 16, 17, and 18 were placed at optimum positions, respectively, and an argon gas of $4 \times 10^2$ Pa (3 Torr) was filled.

For the main amalgams 14 and 15, Bi—Pb—Sn—Hg particles (with a total amount of 110 mg and a mercury ratio of 1.5%) were used. For the auxiliary amalgams 16, 17, and 18, an In-plated stainless steel mesh (a strand width: 0.25 mm, SW (a length of the short diagonal line in a quadrilateral shape defined by strands): 0.70 mm, LW (a length of the long diagonal line in a quadrilateral shape defined by strands): 1.30 mm, and a plate thickness: 0.21 mm), respectively, were used. The contents of the main amalgams are:

Bi/Pb/Sn/Hg: 45.3/19.7/33.5/1.5 (wt. %).

The outer diameters d of the U-shaped glass tubes 2, 3, and 4 are set to be 10.7 mm and the height h and the width w of the discharge tube 1 were set to be 60 mm and 36 mm, respectively. In the small tubes 25 and 26, the outer diameter, inner diameter, and the outer length are set to be 4.1 mm, 3.7 mm, and 7 mm.

In a bulb-shaped fluorescent lamp as a finished product, for example, as shown in FIG. 3, the discharge tube 1 and an electronic lighting circuit 20 are attached to a holder 19. The holder 19 is placed inside the case 22 having a base 21 so that the electronic lighting circuit 20 is positioned inside the case 22, and to this case 22, the glass globe 45 is fixed.

According to such a configuration, the luminous-flux rise characteristics after a start of lamp operation can be improved further even in the case of a relatively short non-operation time of one to six hours after a stop of operation. Thus, a small fluorescent discharge tube and bulb-shaped fluorescent lamp with an excellent luminous-flux rise characteristics were obtained.

The following description is directed to the results of a study investigating the positions of the main amalgams and the auxiliary amalgams which improves the luminous-flux rise characteristics directly at a start of lamp operation, even in the case of a relatively short non-operation time after a stop of operation.

Figure 11:
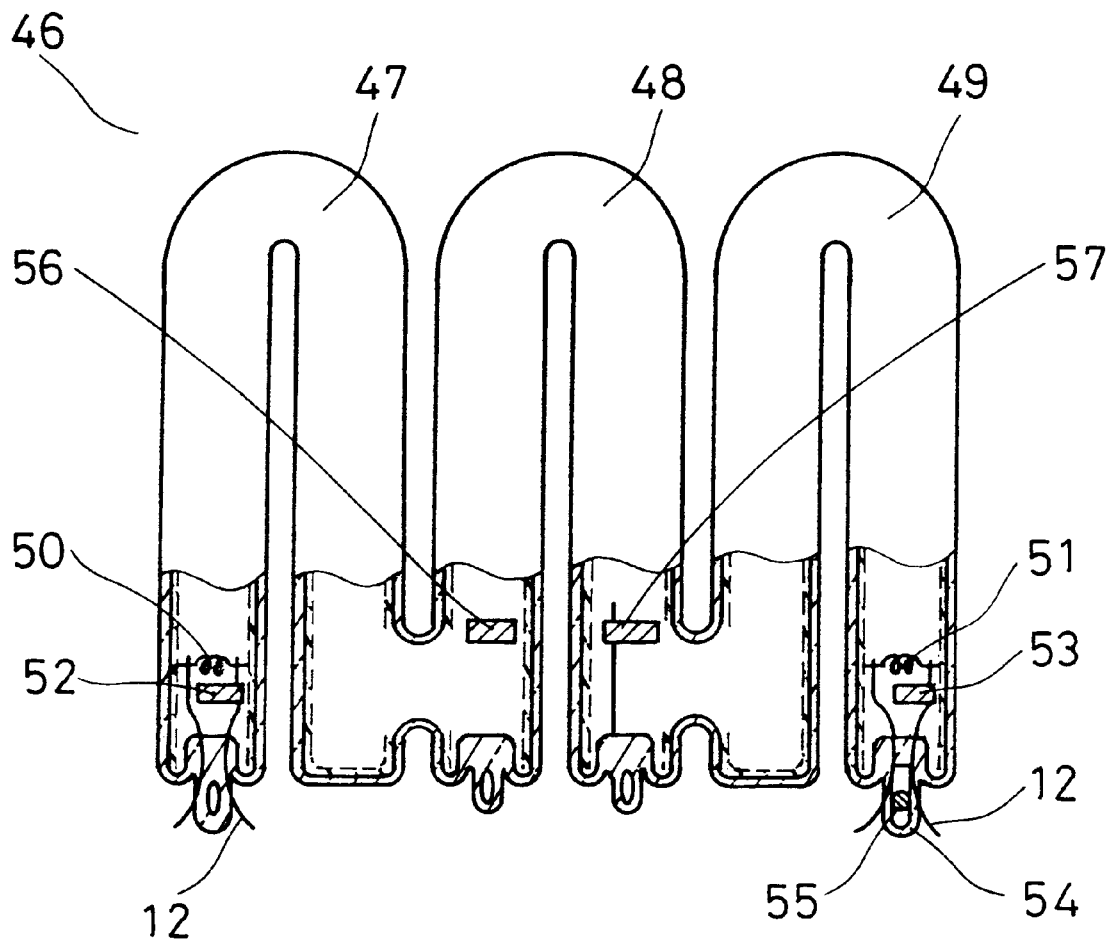
FIG. 11 is a partially cutaway development of a conventional fluorescent discharge tube.

(a) As shown in FIG. 11, the two auxiliary amalgams 52 and 53 are fixed to the lead wires 12 supporting the electrodes 50 and 51, respectively, so as to be positioned adjacent to the electrodes 50 and 51 at a distance of 2 mm from the electrodes 50 and 51. This configuration enables mercury trapped by the auxiliary amalgams 52 and 53 to be evaporated rapidly by being heated by the electrodes 50 and 51 after a start of lamp operation, which thus is effective in improving the luminous-flux rise characteristics. However, it was found that the above-mentioned means alone is not sufficient for improving the luminous-flux rise characteristics in the case of a relatively short non-operation time of one to six hours after a stop of lamp operation, which is an object of the present invention.

In other words, in a conventional discharge tube 46 (herein after referred to as a "conventional product A") shown in FIG. 11, three U-shaped glass tubes 47, 48, and 49 are joined by the bridge junction. At both ends of the discharge tube, the electrodes 50 and 51 are provided, respectively. Auxiliary amalgams 52 and 53 are provided in locations adjacent to the electrodes 50 and 51. A main amalgam 55 is provided inside a small tube 54 at an end of the tube 49 in which the electrode 51 is positioned, and two auxiliary amalgams 56 and 57 are provided in a discharge path inside the U-shaped glass tube 48 in which the electrodes 50 and 51 are not included. The conventional product A requires a longer luminous-flux rise time in the case of a non-operation time of one to six hours after a stop of lamp operation. The reason is that a large portion of the mercury evaporated and diffused from the main amalgam 55 during a non-operation time of one to six hours is trapped by the auxiliary amalgam 53 adjacent to the main amalgam 55, while a smaller amount of mercury is trapped by the auxiliary amalgam 52 provided at a distance from the main amalgam 55 in the other U-shaped glass tube 47. As a result, the function of the auxiliary amalgam 52 is not exerted effectively.

Therefore, in the discharge tube 1 according to the embodiment of the present invention as shown in FIG. 2, the following was found. It is an effective method to place the main amalgams 14 and 15 at one end (indicated with numerals 23 and 24 in FIG. 2) of the U-shaped glass tubes 2 and 4 having electrodes 9 and 10 and the first auxiliary amalgams 16 and 18 at the other end. In addition, by placing the main amalgams 14 and 15 as described above, an equal amount of mercury diffuses from the main amalgams 14 and 15 to the first auxiliary amalgams 16 and 18, respectively, and the amounts of mercury trapped by the respective first auxiliary amalgams 16 and 18 increase equally.

Figure 4:
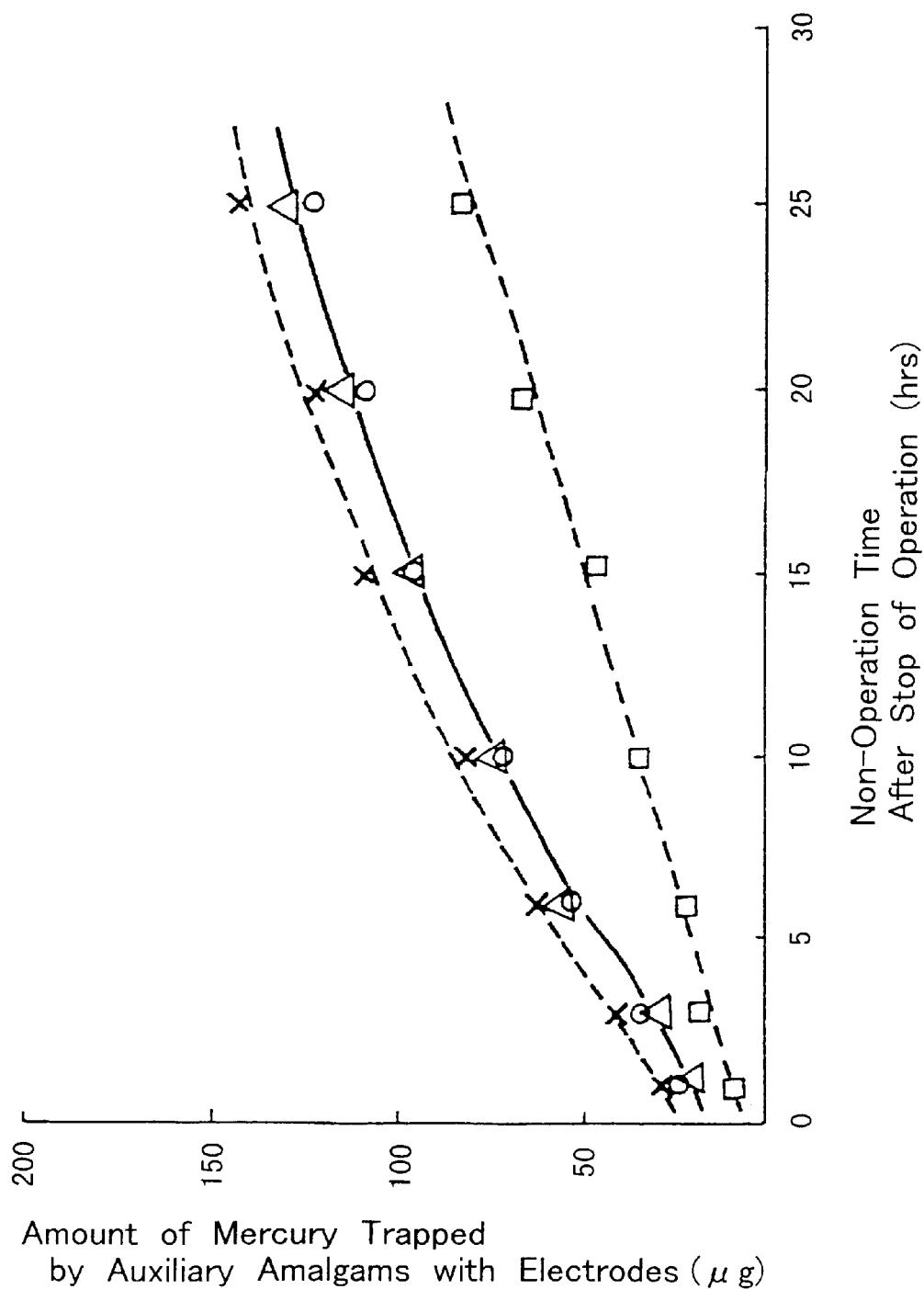
FIG. 4 is a graph showing the relationship between a non-operation time and an amount of mercury trapped by auxiliary amalgams adjacent to electrodes.

As is apparent from FIG. 4, in the discharge tube 1 of the present embodiment, the amounts of mercury trapped by the respective first auxiliary amalgams 16 and 18 (in FIG. 4, symbols ○ and △ indicate the amounts of mercury trapped by the auxiliary amalgams 16 and 18, respectively) increase equally even after a relatively short non-operation time after a stop of operation. On the other hand, in the conventional product A shown in FIG. 11, the amounts of mercury trapped by the respective auxiliary amalgams 52 and 53 (in FIG. 4, symbols □ and × indicate the amounts of mercury trapped by the auxiliary amalgams 52 and 53, respectively) are uneven.

Figure 5:
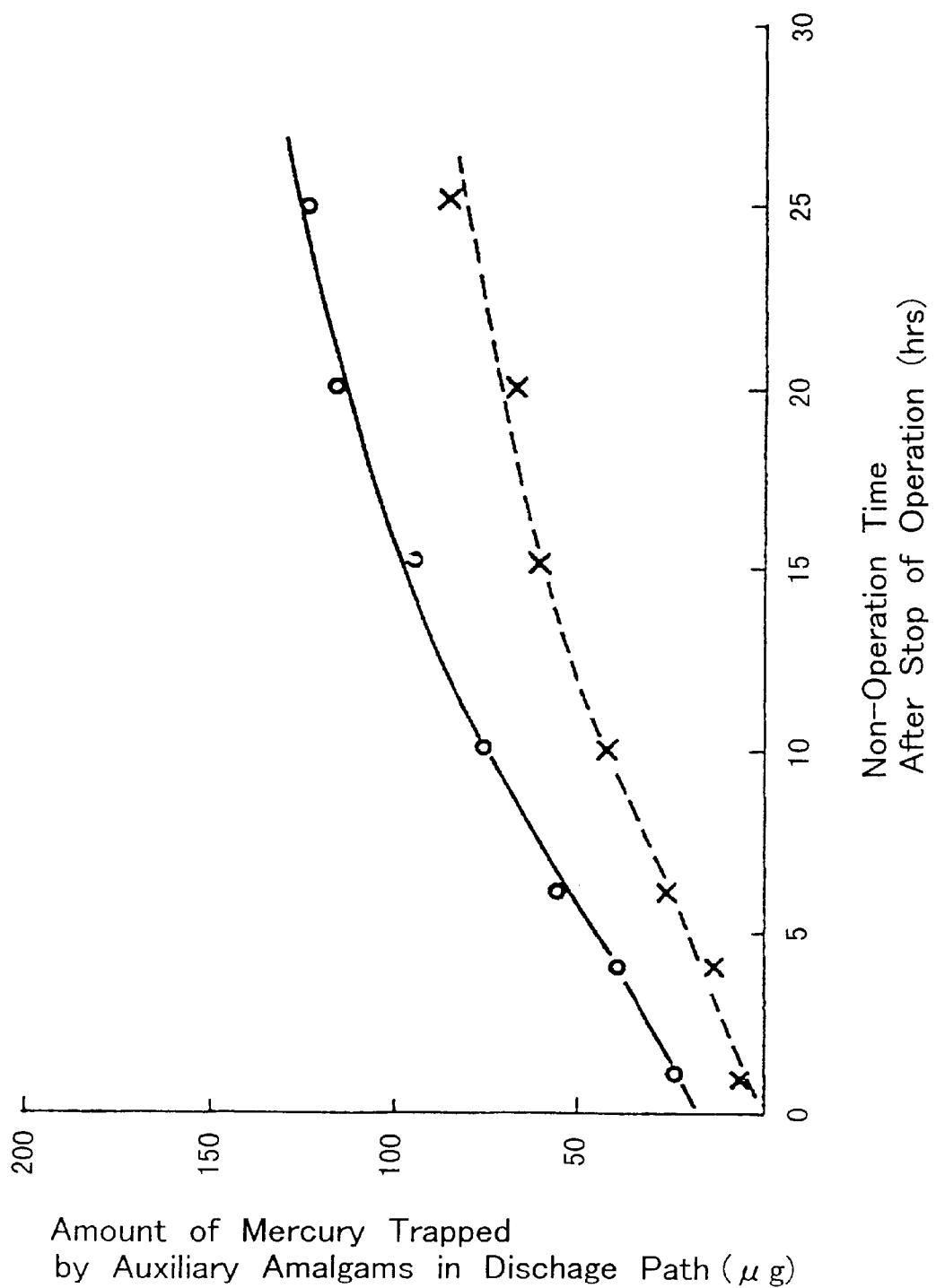
FIG. 5 is a graph showing the relationship between a non-operation time and an amount of mercury trapped by another auxiliary amalgam in a discharge path

(b) An examination was conducted with respect to a conventional discharge tube 58 (hereinafter referred to as a "conventional product B") shown in FIG. 12. In the conventional product B, three U-shaped glass tubes 59, 60, and 61 are joined by the bridge junction. Electrodes 62 and 63 are provided at both ends of the discharge tube, respectively. Auxiliary amalgams 68 and 69 are provided in locations adjacent to the electrodes 62 and 63. Main amalgams 66 and 67 are provided inside small tubes 64 and 65 at the ends of the tubes in which the electrodes 62 and 63 are positioned, and one auxiliary amalgam 70 is provided in a discharge path inside the U-shaped glass tube 60 in which the electrodes 62 and 63 are not included. As shown in FIG. 5, it can be seen that in the conventional product B, a small amount of mercury is trapped by the auxiliary amalgam 70 provided in the discharge path in the case of a relatively short non-operation time of one to six hours after a stop of operation. The reason is that most of the mercury diffused from the main amalgams 66 and 67 is trapped by the auxiliary amalgams 68 and 69 provided in the vicinities of the electrodes 62 and 63, which means that the function of the auxiliary amalgam 70 is not exerted effectively.

The function of the auxiliary amalgam 70 provided in the discharge path can be exerted only when the amount of trapped mercury is increased to be in a specific range and the non-operation time after a stop of operation is longer than about 15 hours. Therefore, in order to improve the luminous-flux rise characteristics, it is necessary to increase the amounts of mercury trapped by the two respective auxiliary amalgams 68 and 69 equally, even in the case of a relatively short non-operation time after a stop of operation.

On the contrary, in the discharge tube 1 according to the present embodiment, it also is effective in allowing the function of the second auxiliary amalgam 17 provided in the discharge path to be exerted in the case of a relatively short non-operation time to place the main amalgams 14 and 15 at one ends (indicated by numerals 23 and 24 in FIG. 2) of the U-shaped glass tubes 2 and 4 having the electrodes 9 and 10 and the first auxiliary amalgams 16 and 18 at the other ends, respectively.

In the discharge tube 1 according to the present embodiment, the second auxiliary amalgam 17 positioned in the discharge path is closer to the main amalgams 14 and 15 compared to the case of the conventional product B. Accordingly, the amount of mercury trapped by the second auxiliary amalgam 17 is increased in comparison to that in the conventional product B, even in the case of a relatively short non-operation time after a stop of operation.

Figure 12:
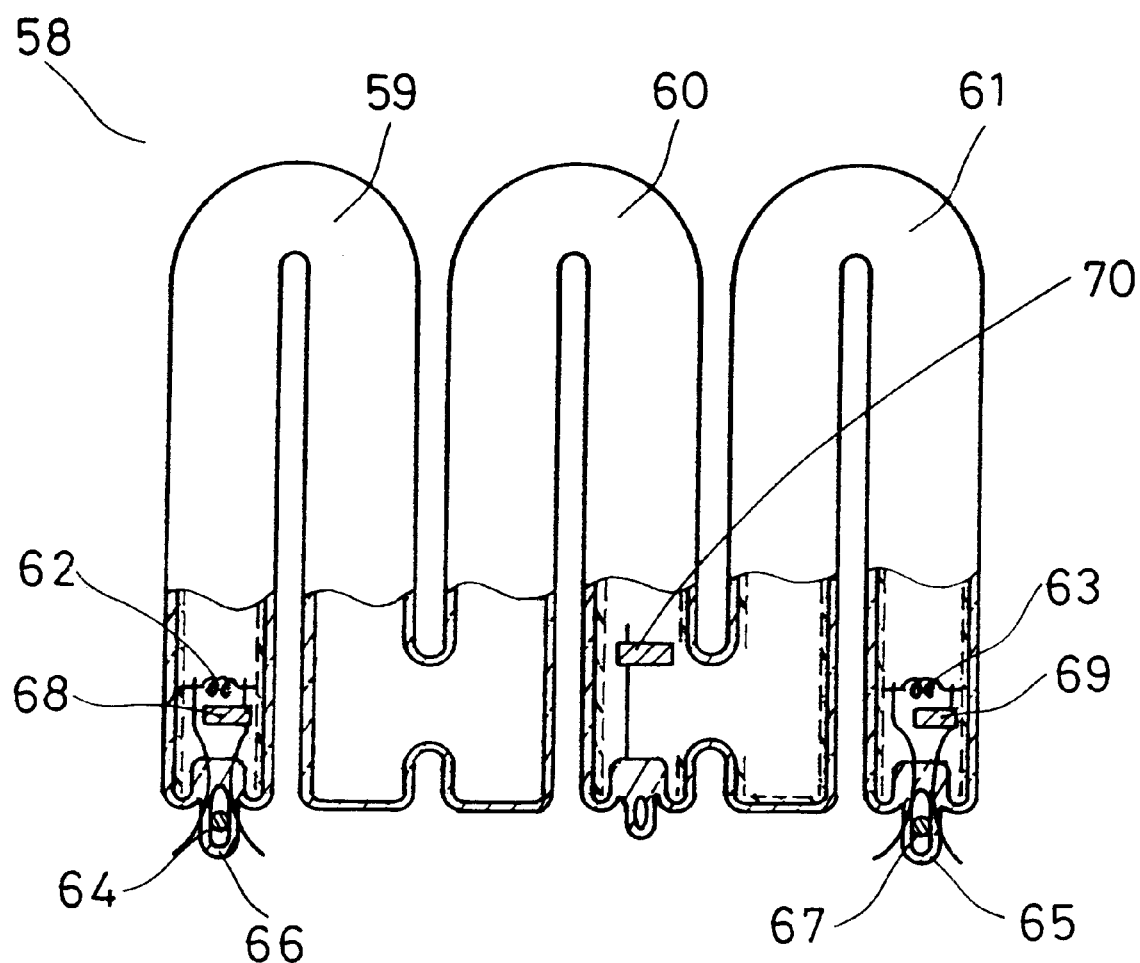
FIG. 12 is a partially cutaway development of a conventional fluorescent discharge tube.

As is apparent from FIG. 5, in the discharge tube 1 according to the present embodiment, the amount (indicated with a symbol ○ in FIG. 5) of mercury trapped by the second auxiliary amalgam 17 provided in the discharge path is increased when compared to the amount (indicated with a symbol × in FIG. 5) of mercury trapped by the auxiliary amalgam 70 in the conventional product B shown in FIG. 12.

Figure 6:
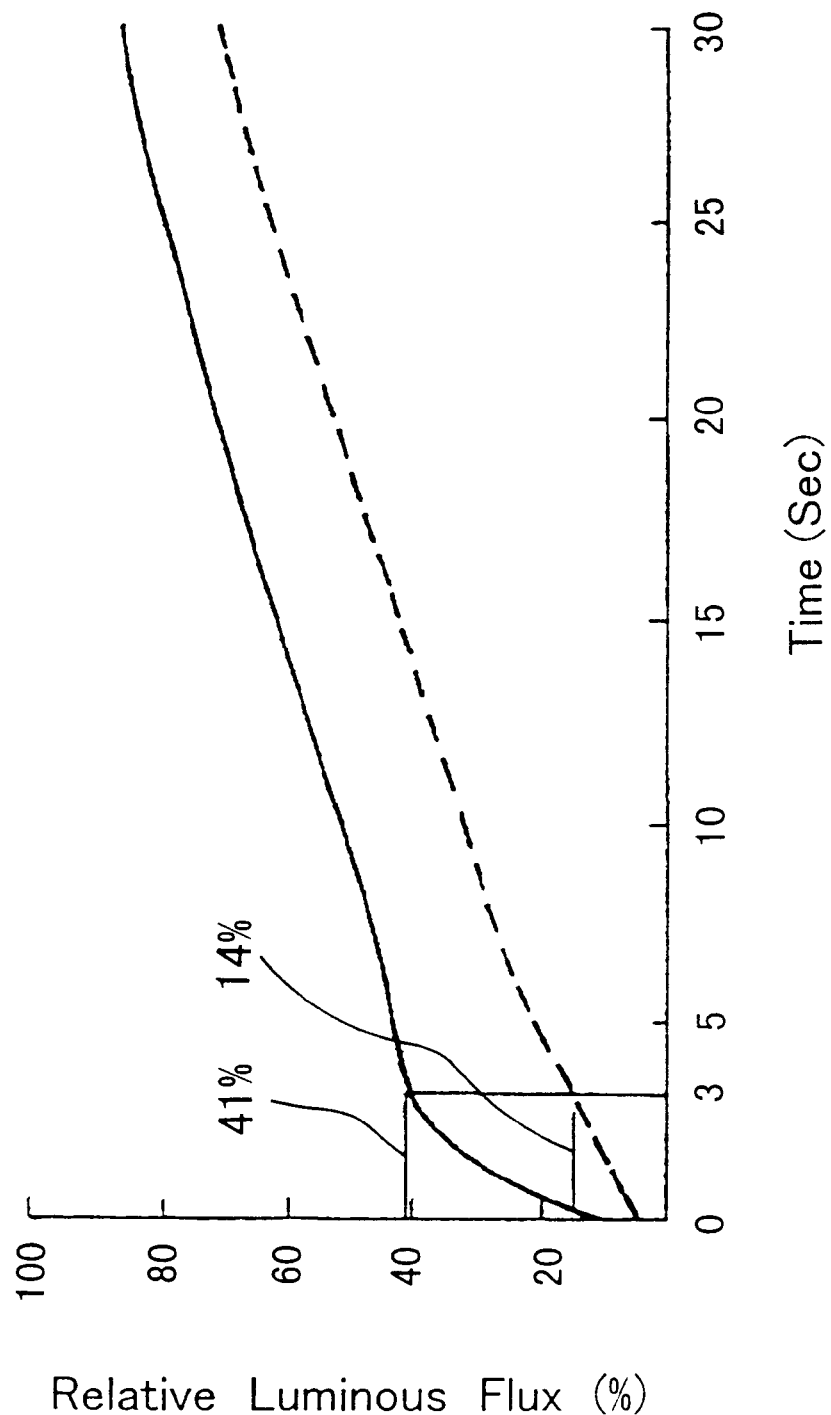
FIG. 6 is a graph showing the comparison in luminous-flux rise characteristics between the fluorescent discharge tube according to the first embodiment of the present invention and a lamp of a conventional product A shown in FIG. 11.

FIG. 6 shows the luminous-flux rise characteristics (indicated with a solid line) in the case of a non-operation time of 6 hours after a stop of operation with respect to the discharge tube 1 according to the present embodiment in which two main amalgams and four auxiliary amalgams are placed at optimum positions respectively based on the above (a) and (b). For comparison, FIG. 6 also shows the luminous-flux rise characteristics (indicated with a broken line) of the conventional product A shown in FIG. 11 according to the conventional technique as an example. In this case, the luminous flux during a stable operation is taken as 100%. The same result as that in the conventional product A was obtained with respect to the conventional product B.

As is apparent from FIG. 6, the luminous-flux rise characteristics of the discharge tube 1 according to the present embodiment is further improved compared to those of the conventional product A. For example, the luminous flux after an elapse of three seconds from a start of operation reaches 41% of that obtained during a stable operation in the discharge tube 1 according to the present embodiment while it is 14% in the conventional product A. The relative value of luminous flux had a point of inflection at an elapsed time of three seconds after a start of operation.

As described above, in the present embodiment, the fluorescent discharge tube 1 includes the three U-shaped glass tubes 2, 3, and 4 joined to form one body, the electrodes 9 and 10 provided at the ends thereof, and one discharge path formed therein. Auxiliary amalgams 16 and 18 in the vicinities of the electrodes 9 and 10 and a second auxiliary amalgam 17 in the discharge path inside the U-shaped glass tube 3 other than the U-shaped glass tubes 2 and 4 positioned at the both ends of the discharge tube 1. The U-shaped glass tubes 2 and 4 positioned at the ends of the discharge tube 1 are provided with the electrodes 9 and 10 and the auxiliary amalgams 16 and 18 at one end and the main amalgams 14 and 15 at the other end. This configuration allows the respective auxiliary amalgams 16, 17 and 18 to trap a predetermined amount of mercury diffused from the main amalgams 14 and 15 equally. Thus, the luminous-flux rise characteristics can be improved further even in the case of a relatively short non-operation time of one to six hours after a stop of operation.

Second Embodiment

A second embodiment of the present invention is described with reference to the drawings as follows.

Figure 7:
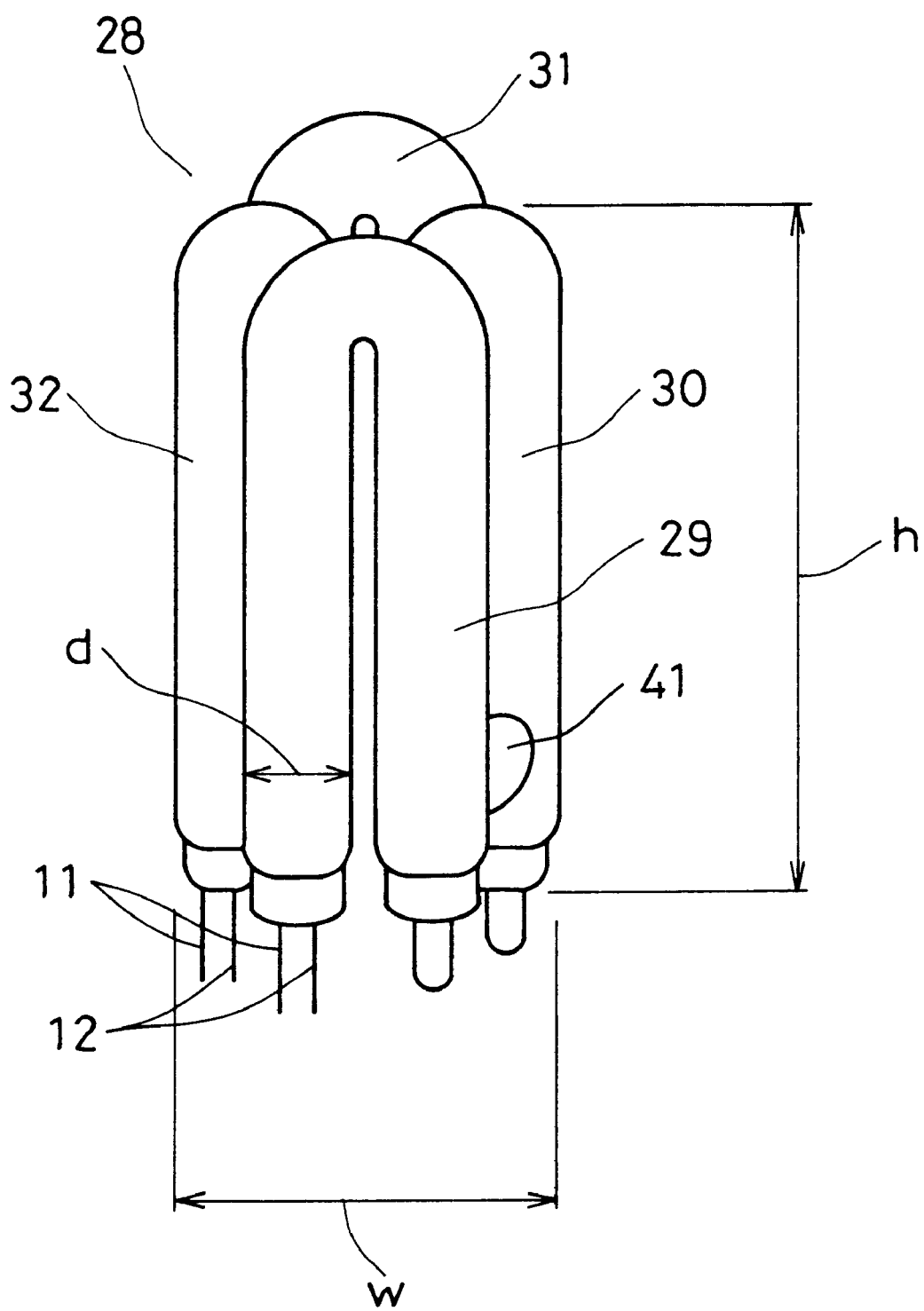
FIG. 7 is a perspective view of a fluorescent discharge tube according to a second embodiment of the present invention.
Figure 8:
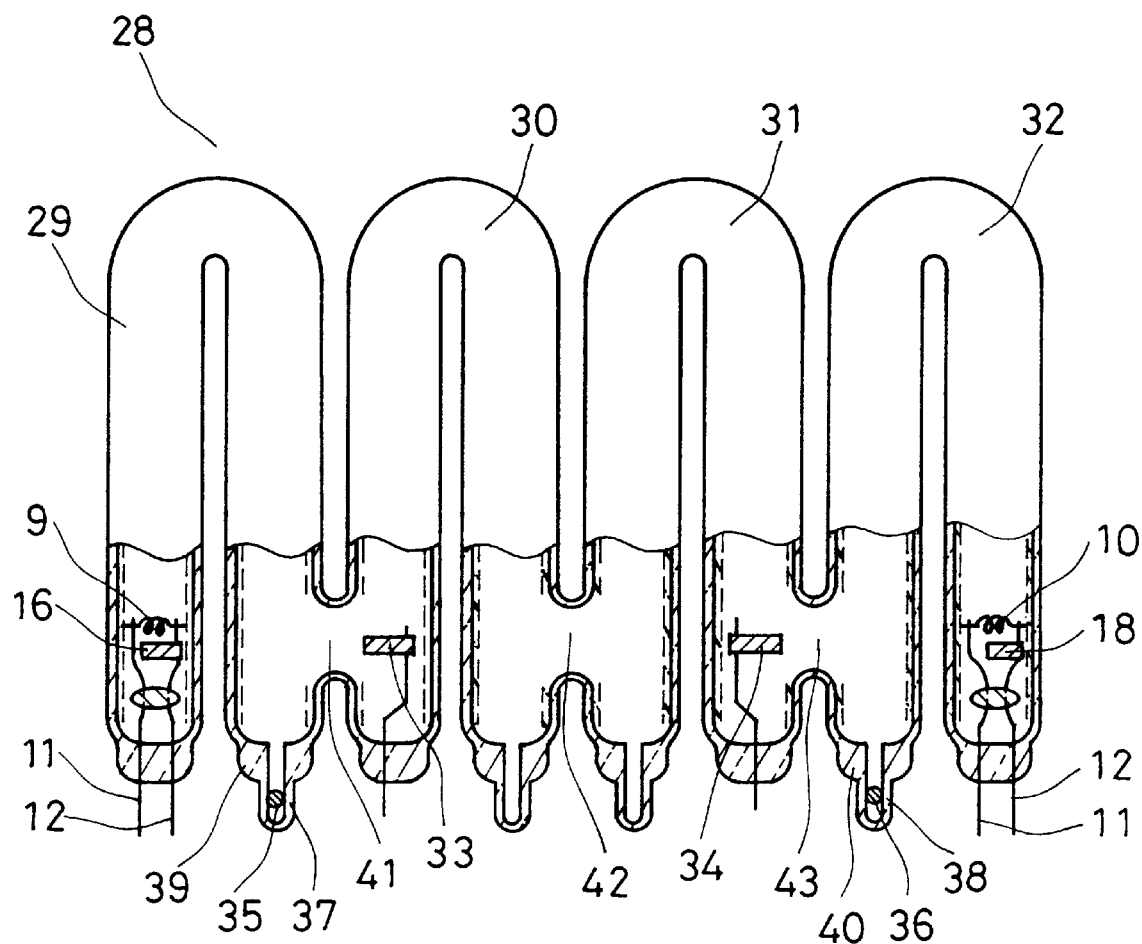
FIG. 8 is a development of the fluorescent discharge tube shown in FIG. 7.

As shown in FIGS. 7 and 8, a bulb-shaped fluorescent lamp according to a second embodiment of the present invention has the same configuration as that of the first embodiment except that in the bulb-shaped fluorescent lamp according to the second embodiment, a discharge tube 28 is formed of four U-shaped glass tubes 29, 30, 31, and 32 joined with bridge junctions 41, 42, and 43 to form one body, and second auxiliary amalgams 33 and 34 are provided inside and at one end of two U-shaped glass tubes 30 and 31 between the U-shaped glass tubes 29 and 32 at the ends of the discharge tube 28. The outer diameter d of the U-shaped glass tubes 29, 30, 31, and 32 is set to be 10.7 mm, and the height h and the width w of the discharge tube are set to be 75 mm and 41 mm, respectively. In the same way as in the first embodiment, the main amalgams 35 and 36 are provided inside small tubes 37 and 38 provided at ends 39 and 40, at which the electrodes 9 and 10 and first auxiliary amalgams 16 and 18 are not provided, of the U-shaped glass tubes 29 and 32 positioned at the both ends of the discharge tube 28. The small tubes have the same size as in the first embodiment.

According to such a configuration, the luminous-flux rise characteristics after a start of lamp operation was improved further, even in the case of a relatively short non-operation time of one to six hours after a stop of operation. Thus, a small fluorescent discharge tube and bulb-shaped fluorescent lamp with an excellent luminous-flux rise characteristics were obtained.

Figure 9:
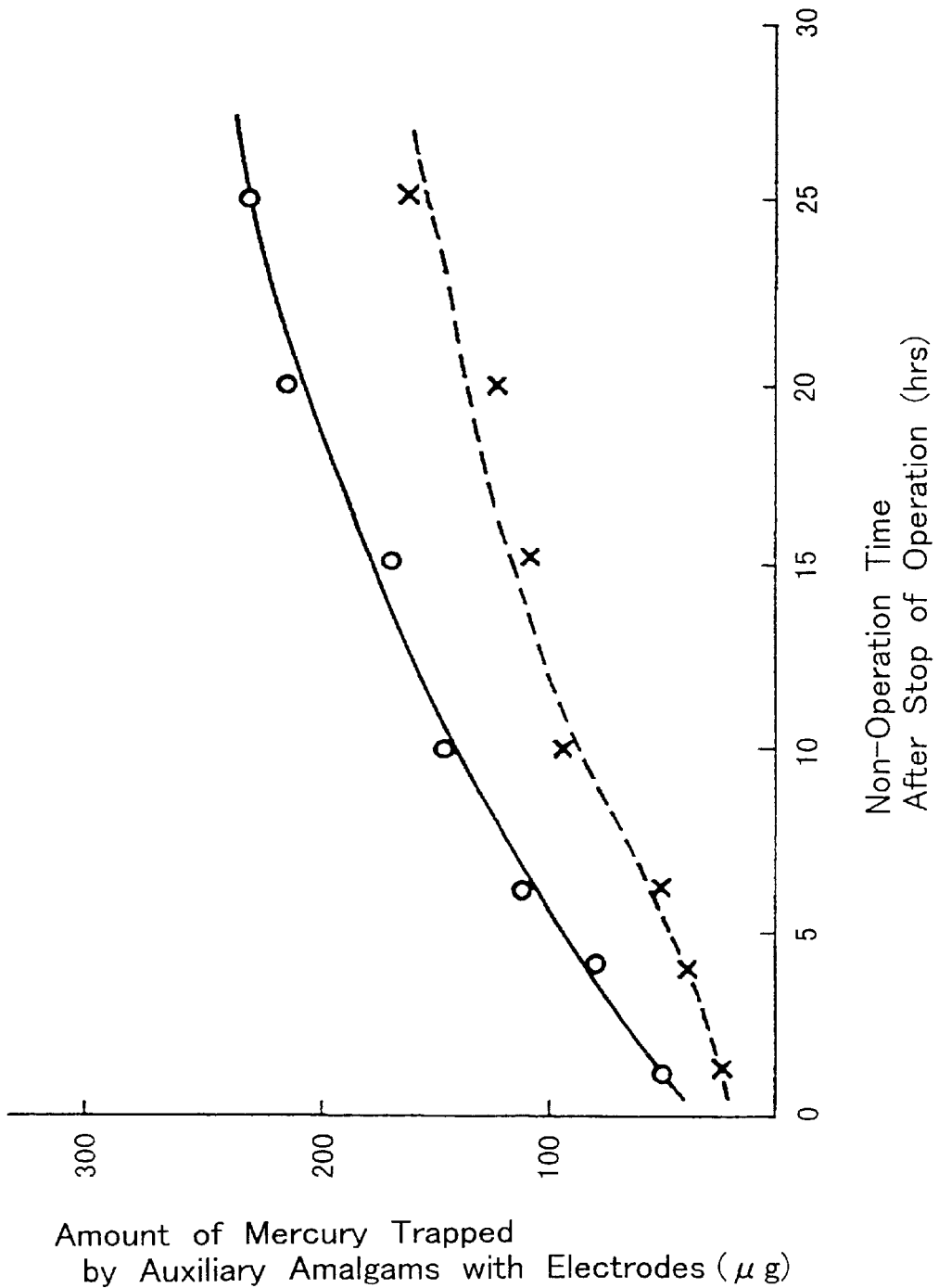
FIG. 9 is a graph showing the relationship between a non-operation time and an amount of mercury trapped by auxiliary amalgams.
Figure 13:
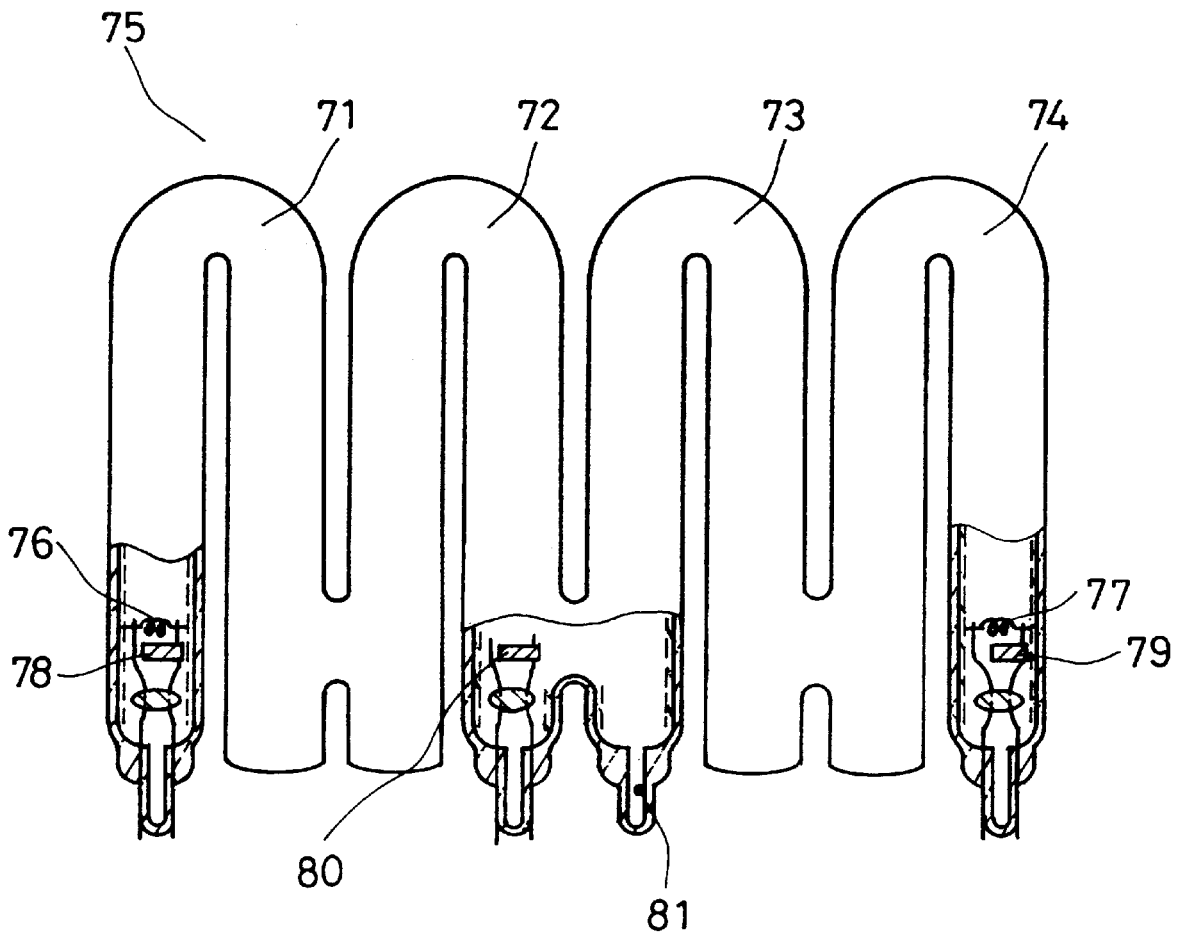
FIG. 13 is a partially cutaway development of a conventional fluorescent discharge tube.

Amounts of mercury trapped by the auxiliary amalgams 16 and 18 were measured with respect to the non-operation time after a stop of operation in the discharge tube 28 according to the present embodiment and a conventional discharge tube 75 (hereinafter referred to as a "conventional product C") shown in FIG. 13, respectively. In the conventional product C, the discharge tube 75 is formed of four U-shaped glass tubes 71, 72, 73, and 74 joined by the bridge junction to form one discharge path therein. Electrodes 76 and 77 are provided at one ends of the U-shaped glass tubes 71 and 74 positioned at the ends of the discharge tube. Auxiliary amalgams 78 and 79 are provided in the vicinities of the electrodes 76 and 77, respectively. An auxiliary amalgam 80 is provided at a location substantially midway in the discharge path, i.e. at an end of the U-shaped glass tube 72. A main amalgam 81 is provided at an end of the U-shaped glass tube 73 provided continuously to the U-shaped glass tube 72 in which the auxiliary amalgam 80 is placed. FIG. 9 shows the measurement results. In FIG. 9, a symbol ○ indicates the total amount of mercury trapped by the auxiliary amalgams 16 and 18 in the discharge tube 28 according to the present embodiment and a symbol × indicates the total amount of mercury trapped by the auxiliary amalgams 78 and 79 in the conventional product C.

As is apparent from FIG. 9, in the discharge tube 28 according to the present embodiment, the amount of mercury trapped by the first auxiliary amalgams 16 and 18 can be increased compared to that in the conventional product C. Therefore, the luminous-flux rise characteristics after a start of lamp operation can be improved further even in the case of a relatively short non-operation time of one to six hours after a stop of operation.

The conventional product C requires a longer rise time with respect to luminous flux in the case of a non-operation time of one to six hours after a stop of operation. This is because the mercury evaporated and diffused from the main amalgam 81 during such a non-operation time mainly is trapped by the auxiliary amalgam 80 and, therefore, lower amounts of mercury are trapped by the auxiliary amalgams 78 and 79.

Therefore, in order to improve such luminous-flux rise characteristics, it is necessary to increase the amounts of mercury trapped by the auxiliary amalgams 78 and 79 even in the case of a relatively short non-operation time after a stop of operation. In order to achieve this, as shown in FIG. 8, by providing the main amalgams 35 and 36 inside the small tubes 37 and 38 provided at the ends 39 and 40, at which the electrodes 9 and 10 and the auxiliary amalgams 16 and 18 are not provided, of the U-shaped glass tubes 29 and 32 positioned at the ends of the discharge tube 28, and by providing the second auxiliary amalgams 33 and 34 in the U-shaped glass tubes 30 and 31 adjacent to the main amalgams 35 and 36, the amounts of mercury diffused from the main amalgams 35 and 36 toward the second auxiliary amalgams 33 and 34 are increased. Therefore the amounts of mercury trapped by the second auxiliary amalgams 33 and 34 are increased accordingly, thus improving the luminous-flux rise characteristics.

Figure 10:
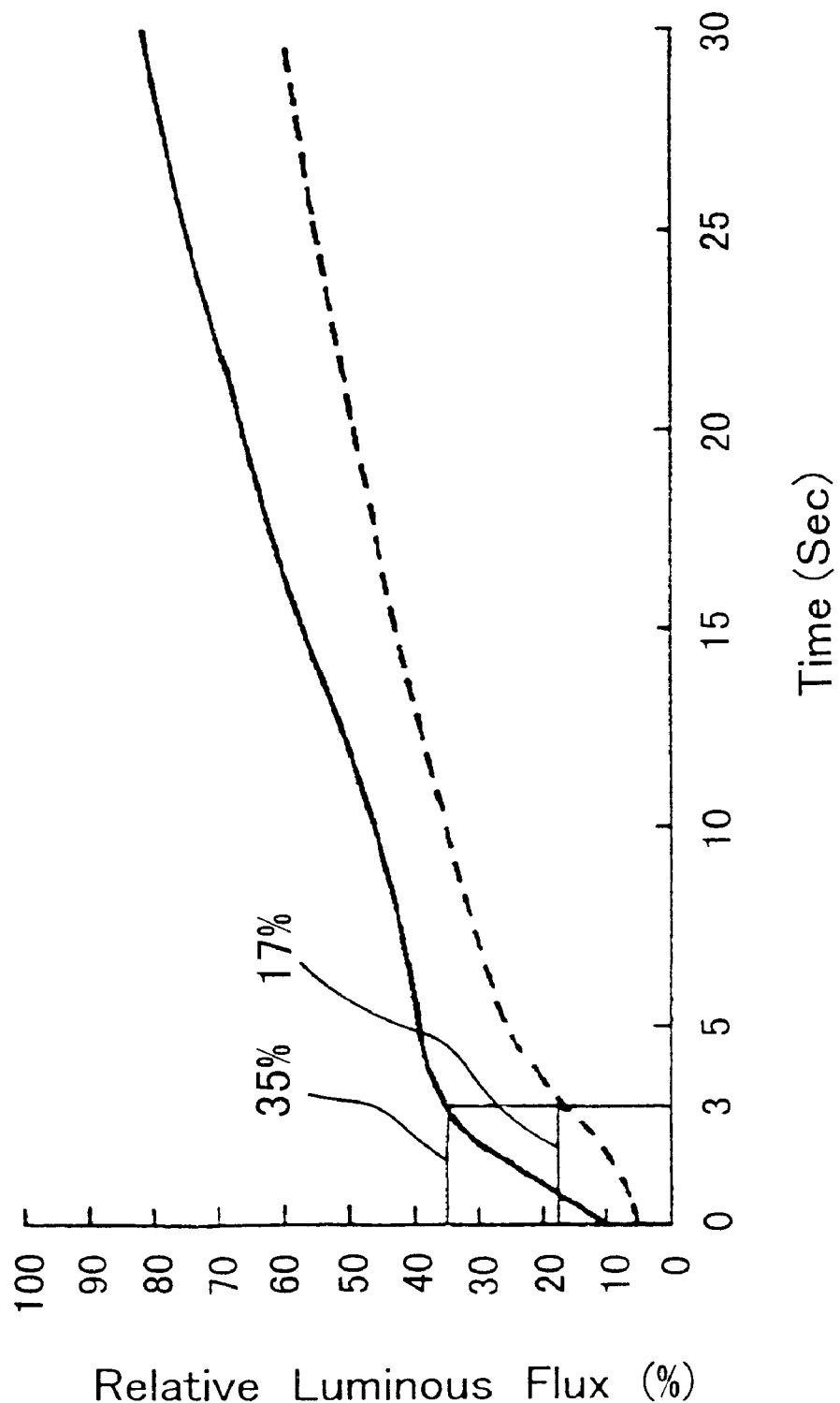
FIG. 10 is a graph showing the comparison in luminous-flux rise characteristics between the fluorescent discharge tube shown in FIG. 7 and a lamp of a conventional product C shown in FIG. 13.

It can be seen from FIG. 10, the luminous-flux rise characteristics (indicated with a solid line) of the discharge tube 28 according to the present embodiment are further improved compared to the luminous-flux rise characteristics (indicated with a broken line) of the conventional product C. For example, a luminous flux after three seconds from a start of operation reaches 35% of that obtained during a stable operation in the discharge tube 28 according to the present embodiment while it is 17% in the conventional product C. The relative values of luminous flux had a point of inflection at an elapsed time of three seconds after a start of operation.

As described above, in the present embodiment, the fluorescent discharge tube 28 includes four U-shaped glass tubes 29, 30, 31, and 32 joined to form one body, the electrodes 9 and 10 provided at the ends thereof, and one discharge path formed therein, the auxiliary amalgams 16 and 18 in the vicinities of the electrodes 9 and 10, and the second auxiliary amalgams 33 and 34 in the discharge path inside the U-shaped glass tubes 30 and 31 other than the U-shaped glass tubes 29 and 32 positioned at the ends of the discharge tube 28. The U-shaped glass tubes 29 and 32 positioned at the both ends of the discharge tube 28 are provided with the electrodes 9 and 10 and the first auxiliary amalgams 16 and 18 at one end and the main amalgams 35 and 36 at the other end, respectively. According to this configuration, a predetermined amount of mercury diffused from the main amalgams 35 and 36 can be trapped equally by the respective auxiliary amalgams 16, 33, 34, and 18. Therefore, the luminous-flux rise characteristics can be improved further even in the case of a relatively short non-operation time of one to six hours after a stop of operation.

In the embodiments, the discharge tubes formed of three and four U-shaped glass tubes joined together were described. However, in the discharge tubes formed of five or more U-shaped glass tubes joined together, the same effect can be obtained when the discharge tubes have the configuration of the present invention.

In the embodiments, the discharge tubes formed of at least three U-shaped glass tubes joined with bridge junctions were described. However, discharge tubes formed of at least three so-called twin-type glass tubes, which are formed of straight glass tubes joined with bridge junctions to form one body, may be used.

Preferably, the auxiliary amalgams in the U-shaped glass tubes between the U-shaped glass tubes at the both ends of the discharge tube provided with the electrodes are provided at the ends of the U-shaped glass tubes adjacent to the U-shaped glass tubes provided with the main amalgams.

In the respective embodiments described above, one auxiliary amalgam was provided per U-shaped glass tube of the discharge tube. However, two auxiliary amalgams may be provided in an intermediate U-shaped glass tube between the U-shaped glass tubes at the both ends of the discharge tube provided with the electrodes, i.e. auxiliary amalgams may be provided at the both ends of the intermediate U-shaped glass tube. In other words, in the case of discharge tube 1 formed of the three U-shaped glass tubes 2, 3, and 4 shown in FIG. 2, auxiliary amalgams may be provided at the both ends of the U-shaped glass tube 3 in the middle. Similarly, in the case of discharge tube 28 formed of the four U-shaped glass tubes 29, 30, 31, and 32 shown in FIG. 8, auxiliary amalgams may be provided at the both ends of the U-shaped glass tubes 30 and 31 between the U-shaped glass tubes 29 and 32. In this case, the luminous-flux rise characteristics can be improved further.

As described above, the present invention can provide a small fluorescent discharge tube and a bulb-shaped fluorescent lamp using the same with further improved luminous-flux rise characteristics in the case of a relatively short non-operation time of one to six hours after a stop of operation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A fluorescent discharge tube including at least three U-shaped glass tubes joined to form one body, electrodes provided at the ends thereof, and one discharge path formed therein, comprising:
   first auxiliary amalgams in vicinities of the electrodes;
   main amalgams placed at least in two locations in the discharge path between the electrodes; and
   a second auxiliary amalgam placed at least in one location between the main amalgams.

2. The fluorescent discharge tube according to claim 1, wherein the main amalgams are positioned at inner ends of the U-shaped glass tubes at both ends of the discharge tube.

3. The fluorescent discharge tube according to claim 2, wherein the main amalgams are positioned inside small tubes projecting at ends of the U-shaped glass tubes.

4. The fluorescent discharge tube according to claim 1, wherein the second auxiliary amalgam is provided inside the U-shaped glass tube other than the U-shaped glass tubes positioned at the both ends of the discharge tube.

5. The fluorescent discharge tube according to claim 1, wherein four U-shaped glass tubes are joined together.

6. The fluorescent discharge tube according to claim 1, wherein the at least three U-shaped glass tubes are joined by bridge junction to form one body.

7. The fluorescent discharge tube according to claim 1, wherein substantially equal amounts of mercury diffused from the main amalgams toward the first auxiliary amalgams are trapped by the first auxiliary amalgams.

8. The fluorescent discharge tube according to claim 1, wherein a point of inflection in relative luminous flux is present within an elapsed time of five seconds after a start of operation when the fluorescent discharge tube is operated after a non-operation time of one to six hours after a stop of operation.

9. A bulb-shaped fluorescent lamp, comprising:

a lighting circuit; and a discharge tube including at least three U-shaped glass tubes joined to form one body, electrodes provided at the ends thereof, and one discharge path formed therein, the discharge tube comprising:

first auxiliary amalgams in vicinities of the electrodes;

main amalgams placed at least in two locations in the discharge path between the electrodes; and a second auxiliary amalgam placed at least in one location between the main amalgams.

10. The bulb-shaped fluorescent lamp according to claim 9, further comprising a glass globe covering the fluorescent discharge tube, a case accommodating the lighting circuit, and a base, wherein the glass globe, the case, and the base are fixed.

11. The bulb-shaped fluorescent lamp according to claim 9, wherein the main amalgams are positioned at inner ends of the U-shaped glass tubes at the ends of the discharge tube.

12. The bulb-shaped fluorescent lamp according to claim 9, wherein the main amalgams are positioned inside small tubes projecting at ends of the U-shaped glass tubes.

13. The bulb-shaped fluorescent lamp according to claim 9, wherein the second auxiliary amalgam is provided inside the U-shaped glass tube other than the U-shaped glass tubes positioned at the both ends of the discharge tube.

14. The bulb-shaped fluorescent lamp according to claim 9, wherein four of said U-shaped glass tubes are joined together.

15. The bulb-shaped fluorescent lamp according to claim 9, wherein the at least three U-shaped glass tubes are joined by bridge junction to form one body.

16. The bulb-shaped fluorescent lamp according to claim 9, wherein substantially equal amounts of mercury diffused from the main amalgams toward the first auxiliary amalgams are trapped by the first auxiliary amalgams.

17. The bulb-shaped fluorescent lamp according to claim 9, wherein a point of inflection in relative luminous flux is present within an elapsed time of five seconds after a start of operation when the fluorescent discharge tube is operated after a non-operation time of one to six hours after a stop of operation.

* * * * *

UNITED STATES PATENT AND TRADEMARK OFFICE
CERTIFICATE OF CORRECTION

PATENT NO.     : 6,476,553 B1
DATED          : November 5, 2002
INVENTOR(S)    : Shiro Iida and Takeshi Matsushita It is certified that error appears in the above-identified patent and that said Letters Patent is hereby corrected as shown below:

<u>Title page, Item [54], and Column 1, line 1,</u>
Replace "FLOURESCENT" with -- FLUORESCENT--.

Signed and Sealed this

Eleventh Day of March, 2003

JAMES E. ROGAN
*Director of the United States Patent and Trademark Office*